US009761104B1

(12) United States Patent
Gleason

(10) Patent No.: US 9,761,104 B1
(45) Date of Patent: Sep. 12, 2017

(54) BAGGAGE IDENTIFICATION AND LOCATION SYSTEM

(71) Applicant: Daniel Gleason, Bushnell, FL (US)

(72) Inventor: Daniel Gleason, Bushnell, FL (US)

( * ) Notice: Subject to any disclaimer, the term of this patent is extended or adjusted under 35 U.S.C. 154(b) by 0 days.

(21) Appl. No.: 15/387,387

(22) Filed: Dec. 21, 2016

(51) Int. Cl.
*G08B 13/24* (2006.01)
*G06K 7/10* (2006.01)

(52) U.S. Cl.
CPC ..... *G08B 13/2462* (2013.01); *G06K 7/10198* (2013.01)

(58) Field of Classification Search
CPC combination set(s) only.
See application file for complete search history.

(56) References Cited

U.S. PATENT DOCUMENTS 8,253,557 B2 * 8/2012 Ani ........................ G06Q 10/08 340/539.1
2003/0225612 A1 * 12/2003 DeSimone ............ G06Q 40/08 705/13
2005/0258231 A1 * 11/2005 Wiater ................. G06Q 10/087 235/375
2006/0220857 A1 * 10/2006 August .................. G06K 17/00 340/572.1
2007/0119926 A1 * 5/2007 Sloan ................. G06K 7/10445 235/384

* cited by examiner

*Primary Examiner* — Kabir A Timory
(74) *Attorney, Agent, or Firm* — Gulf Coast Intellectual Property Group

(57) ABSTRACT

A baggage identification and location system is provided with a plurality of baggage tags, a software application, a data center and a plurality of scanners communicably coupled to receive, store, track and maintain the location of the baggage tags ensuing the baggage tags being secured to a piece of luggage. The baggage tags include a first wireless communications module and a second wireless communications module and re further configured with transceivers so as to provide alternate techniques of transmitting location data. Additionally, a GPS module is disposed within the baggage tags. The scanners are deployed along a luggage travel path within an airport and are configured with a communications module that is communicably coupled to the baggage tags. The data center is configured to maintain accounts for users and is further configured to maintain the travel history of each baggage tag registered therewith.

20 Claims, 3 Drawing Sheets

BAGGAGE IDENTIFICATION AND LOCATION SYSTEM

FIELD OF THE INVENTION

The present invention relates generally to baggage identity and location tracking, more specifically a system configured to be deployed by the airline industry wherein the system includes a plurality of identity tags secured to luggage bags, a plurality of scanners deployed at airports and a connected data center that is operable to receive, transmit, store and manipulate data regarding luggage being transported by airline carriers.

BACKGROUND

Millions bottle of people travel by airline every year. In the calendar year of 2015, data indicates that almost 900 million people traveled by air both domestically and internationally. This equates to approximately 400 million pieces of checked baggage accompanying the fliers. Many individuals experience the loss of their luggage either permanently or when it is delayed as a result of the luggage not being placed on the same flight as the traveler. When the luggage is permanently lost, the airline responsible for the loss must reimburse the traveler. Some reports show that the airlines have spent a combined annual total of almost 4 billion dollars in lost baggage reimbursement fees. The cost of the aforementioned lost luggage reimbursement fees is a significant burden to the profitability of the airline industry and remains one of the top dis-satisfiers for airline travelers.

One issue with the current baggage system is the lack of the ability to effectively track baggage to a precise location intermediate the conventional checkpoints that exist in the current system. Existing technology leverages barcode scanning to input the checked luggage bag into the system for departure on a scheduled flight. The luggage has placed thereon a paper tag having a barcode that is scanned at initial check-in and additionally scanned prior to loading on a plane. Paper tags can easily become removed and or damaged by either inclement weather on the tarmac or luggage belts and conveyor systems that are used to transport the luggage within an airport facility. Many times an airline traveler will report a lost luggage bag and the airline is unable to determine the location of the luggage bag due to the aforementioned circumstances.

Accordingly, there is a need for a luggage identification and location system that can provide precise geographic coordinates of the checked luggage and is further operable to provide the traveler's travel history and contact information.

SUMMARY OF THE INVENTION

It is the object of the present invention to provide a baggage identification and location system that is configured to provide the whereabouts of a piece of luggage that includes a plurality of baggage tag devices that are releasably secured to luggage bags.

Another object of the present invention is to provide a baggage location tracking and identification system that is operable to provide the location of a piece of baggage that has been checked by an airline passenger wherein the baggage tag devices are housed in a weatherproof housing and include components disposed therein such as but not limited to a power supply, memory card, GPS receiver, RFID module, wireless communications module, audio speaker and a central processing unit.

A further object of the present invention is to provide a baggage identification and location system that is configured to provide the whereabouts of a piece of luggage wherein the system of the present invention includes a plurality of scanners that are deployed within airport facilities in locations such as but not limited to check-in counters and cargo processing areas.

Still another object of the present invention is to provide a baggage tracking and identification system that is configured to assist an airline and a baggage owner identify a checked bag and provide the location thereof that includes a data center wherein the data center includes sufficient computing devices to provide operation and control of the baggage identification and location system.

An additional object of the present invention is to provide a baggage location tracking and identification system that is operable to provide the location of a piece of baggage that has been checked by an airline passenger that further includes a software application on a computing device such as but not limited to a smart phone that is configured to provide a user interface for control of the plurality of baggage tags.

Yet a further object of the present invention is to provide a baggage identification and location system that is configured to provide the whereabouts of a piece of luggage wherein the method of operation of the present invention includes assignment and entry of a unique PIN identifier that is associated with each of the plurality of baggage tags.

Another object of the present invention is to provide a baggage location tracking and identification system that is operable to provide the location of a piece of baggage that has been checked by an airline passenger wherein method of the present invention includes the step wherein the owner/operator of the baggage identification and location system collects a transactional fee from participating airlines that have deployed and are utilizing the system of the present invention.

Still and additional object of the present invention is to provide a baggage tracking and identification system that is configured to assist an airline and a baggage owner identify a checked bag and provide the location thereof wherein the scanners of the present invention deployed at airport facilities further include wireless communication modules that are configured to receive/transmit signals from proximate baggage tag devices of the present invention.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
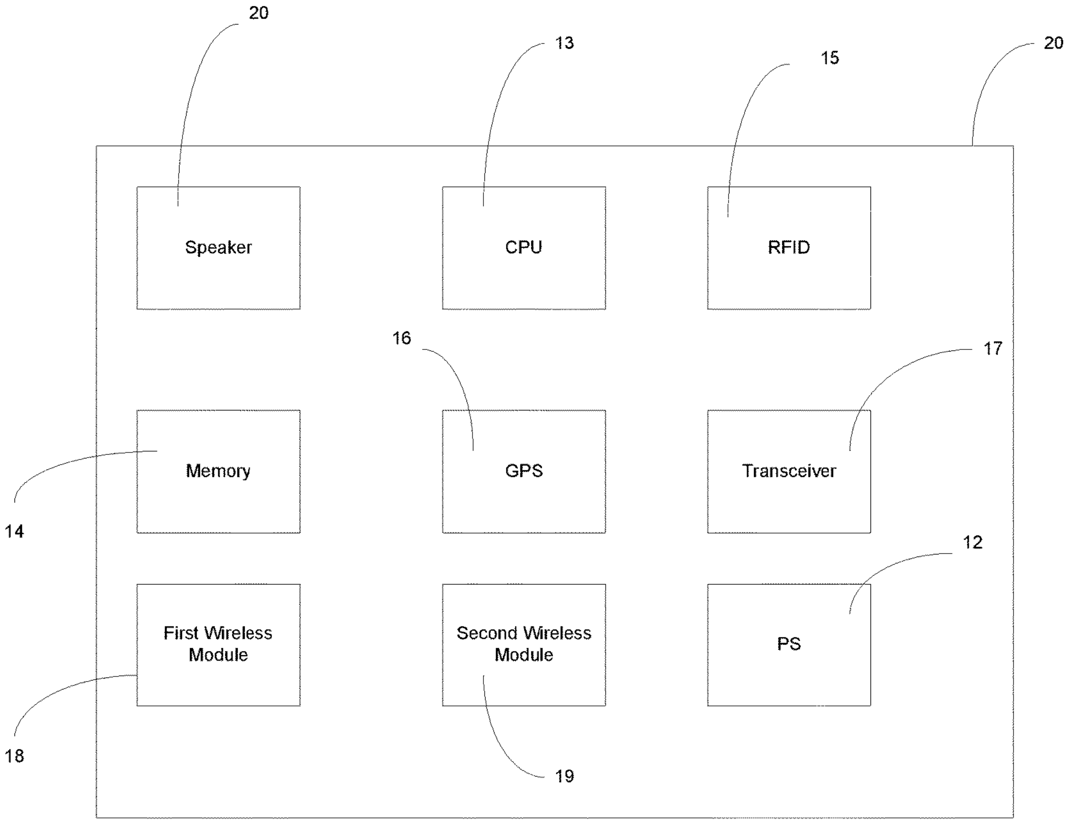
FIG. 1 is a schematic diagram of a baggage tag device of the present invention.

Referring now to the drawings submitted herewith, wherein various elements depicted therein are not necessarily drawn to scale and wherein through the views and figures like elements are referenced with identical reference numerals, there is illustrated a baggage identification and location system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring now in particular to FIG. 1 submitted herewith, the baggage identification and location system 100 includes a plurality of baggage tag devices 10. The baggage tag devices 10 are include a housing 11 that is manufactured from durable suitable material such as but not limited to plastic. The baggage tag devices 10 are configured to be coupled to a conventional piece of baggage. As further discussed herein the baggage tag devices 10 are coupled to an individual's baggage and operable to receive and transmit signals to the data center 300 of the present invention in order to track and provide the location thereof. The baggage tag device 10 includes a power supply 12 disposed within the housing 11 that provides the power for the operation thereof. While no particular power source is required, it is contemplated within the scope of the present invention that the power source is a lithium ion battery. A central processing unit 13 is disposed within the housing 11 and includes the necessary electronics to store, receive, transmit and manipulate data. The central processing unit 13 controls the discussed functionality of the baggage tag device 10. The central processing unit 13 is operably coupled to the memory card 14 wherein the memory card 14 is a conventional memory chip and is operable to store data thereon.

The baggage tag device 10 includes an RFID chip 15. The present invention relies on a plurality of communication protocols to ensure that the baggage tag device 10 can be located regardless of location, specifically whether the baggage tag device 10 is within an airport facility or in an outside environment. In order to execute the ability to locate and track the baggage tag device 10 as intended within the scope of the present invention, several types of communication protocols must be employed. The RFID chip 15 is a passive RFID chip that is operable to communicate with the RFID reader module 210 of the scanner 200. The RFID chip 15 is utilized in areas such as but not limited to baggage receiving and processing areas to provide and subsequently transmit to the data center 300 the current location of the baggage tag device 10.

A GPS receiver 16 is disposed within the housing 11 and is a conventional GPS receiver that is operable to communicate with the GPS satellite network so as to triangulate the geographic coordinates of the baggage tag device 10. The GPS receiver 16 is utilized to provide the location of the baggage tag device 10 during periods of time when the baggage tag device 10 is in outdoor locations such as but not limited to the tarmac. The GPS receiver 16 is operably coupled to the transceiver 17 wherein the transceiver 17 is configured to transmit the geographic coordinates provided thereto by the GPS receiver 16 to the data center 300 so as to provide an update location of the baggage tag device 10. The baggage tag device 10 further includes a first wireless module 18 and a second wireless module 19. The first wireless module 18 is configured as a Bluetooth communications module and is communicably coupled to the communications module 230 disposed within the scanner 200. The first wireless module 18 provides a means for the scanner 200 to locate a baggage tag device 10 when the scanner 200 is within approximately one hundred and fifty feet of the baggage tag device 10. As is further discussed herein, scanners 200 are placed throughout an airport facility in order to facilitate the continual location tracking of the baggage tag device 10. The second wireless module 19 is configured to as a Wi-Fi module and is operable to utilize conventional 802.11 communication protocols to communicate with the communications module 230 disposed within the scanner 200. The second wireless communications module 19 provides effective communication between the baggage tag device 10 and a scanner 200 within a range of approximately four hundred feet. An audio speaker 20 is disposed within the housing 11 of the baggage tag device 10. The audio speaker 20 is a conventional audio speaker and is operably coupled to the central processing unit 13. The audio speaker 20 will emit an audible alarm upon instruction from the central processing unit 13 wherein a signal has been received by the transceiver 17 from the data center 300 to initiate an audio alarm so as to assist in the identification of the location of the baggage tag device 10.

Figure 2:
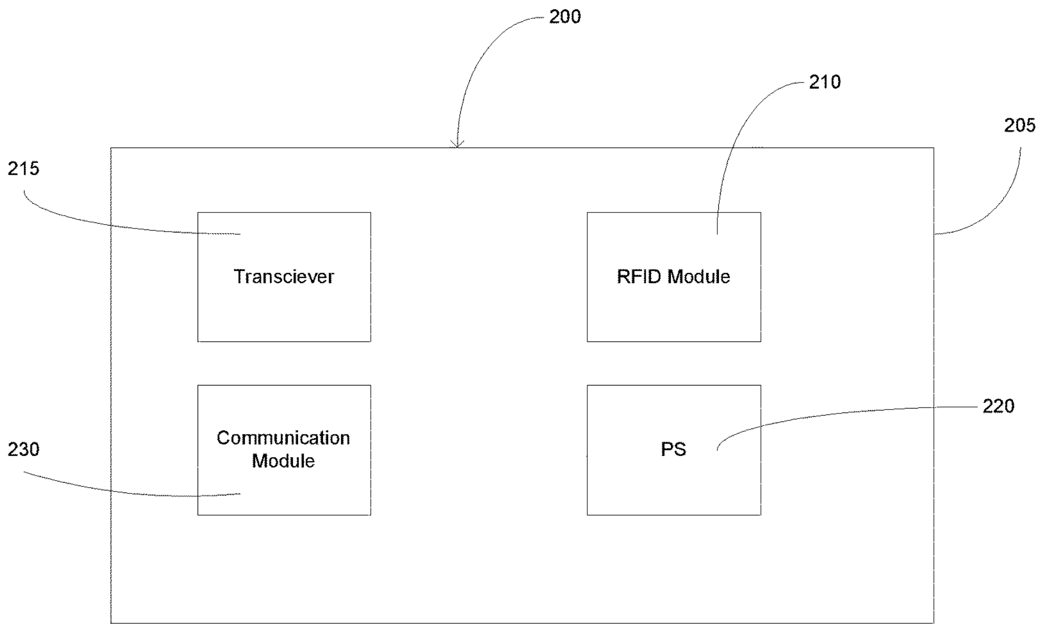
FIG. 2 is a schematic diagram of a scanner of the present invention.

Referring in particular to FIG. 2 herein, a schematic view of the scanner 200 of the present invention is illustrated therein. The baggage identification and location system 100 deploys a plurality of scanners 200 throughout an airport facility so as to facilitate the initial check-in of a bag having a baggage tag device 10 coupled thereto. Additionally, the plurality of scanners 20 are networked utilizing conventional networking protocols establishing a technique of communicating with and providing the location of a plurality of baggage tag devices 10 that are coupled to bags being transported via an airline. The scanners 200 have a housing 205 that is constructed in various shapes and sizes depending upon the mounting location thereof. By way of example but not limitation, the housing 205 could be constructed to integrally mount with a door frame or be secured to a countertop. The scanners 200 are equipped with a communications module 230 that is constructed and configured to utilize several different communication protocols to establish communication with the baggage tag devices 10. The communications module 230 is operable to communicate with the first wireless module 18 and second wireless module 19 utilizing the wireless communication protocols previously discussed herein. The scanners 200 further include a RFID module 210 that is operable to read the RFID chip 15 disposed within the baggage tag device 10. The RFID chip 15 is programmed via the software application as further discussed herein to contain information about the baggage tag device 10 owner such as but not limited to contact information. It is further contemplated within the scope of the present invention that the RFID chip 15 could further be programmed with a unique personal identification number so as to provide a specific identity for the baggage tag device 10. A transceiver 215 is disposed within the scanner 200. The transceiver 215 includes the necessary electronics to store, receive transmit and manipulate data signals. The transceiver 215 is operably coupled to the communications module 230 and provides execution of communication protocols required to communicate with the data center 300 and the baggage tag device 10 such as but not limited to Wi-Fi. Ensuing the scanner 200 communicating with a baggage tag device 10, a data signal is sent to the transceiver 215 wherein the data signal is broadcast via the transceiver 215 to the data center 300 wherein the data is stored. The scanners 200 further include a power supply 220 wherein the power supply 220 is operable to provide the necessary power to the scanner 200 to provide the operation thereof. While no particular type of power supply 220 is required, good results have been achieved utilizing a 120V power supply.

Figure 3:
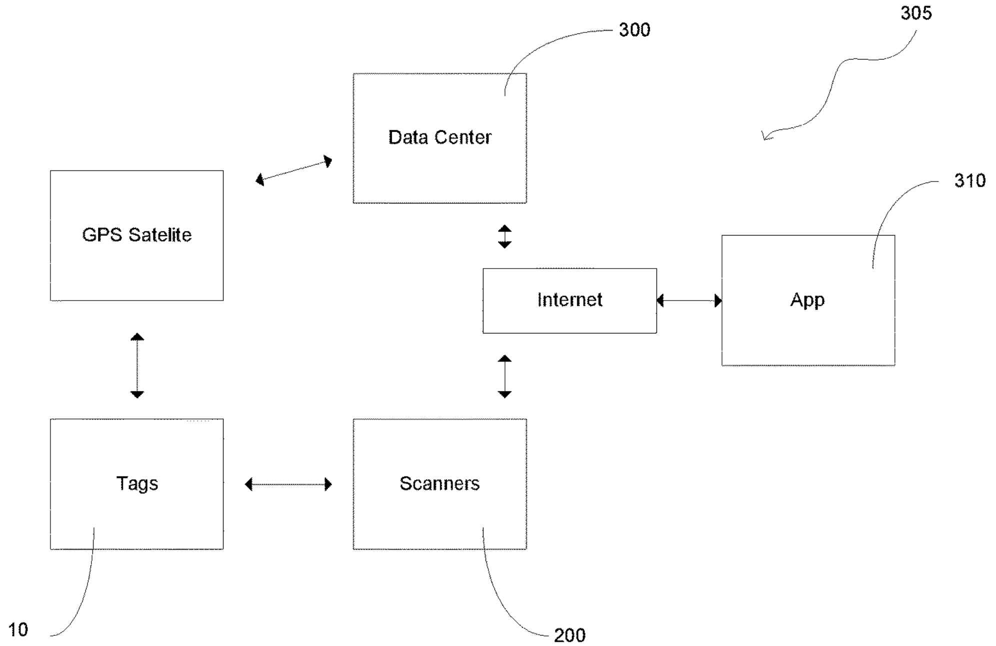
FIG. 3 is a communications diagram of the present invention.

Referring now to FIG. 3, a network schematic of the baggage identification and location system 100 is illustrated therein. The network 305 includes at least one data center 300. The data center 300 is a conventional data center having a plurality of computers operably coupled to the internet wherein the computers are configured with an operating software that facilitates the operation of the baggage identification and location system 100. The data center 300 is configured to execute tasks such as but not limited to account establishment, updating and tracking. The data center 300 is communicably coupled via the Internet to the scanners 200, baggage tag devices 10 and the software application 310. The software application is a conventional software application that is loaded onto a device such as but not limited to a smartphone and provides a graphical interface for a user of the baggage identification and location system 100 and the ability to provide tasks such as but not limited to programming of the baggage tag devices 10 and travel history for each baggage tag device 10. The software application 310 is loaded by a user from a website provided by the operator of the baggage identification and location system 100. The data center 300 includes a database program that contains all of the data pertaining to each of the baggage tag devices 10 registered with the baggage identification and location system 100. The database program stored on the data center 300 is a relational database and provides the establishment of an account for each user of the baggage identification and location system 100 wherein each baggage tag device 10 associated therewith is associated with an account set up for the owner thereof.

Figure 4:
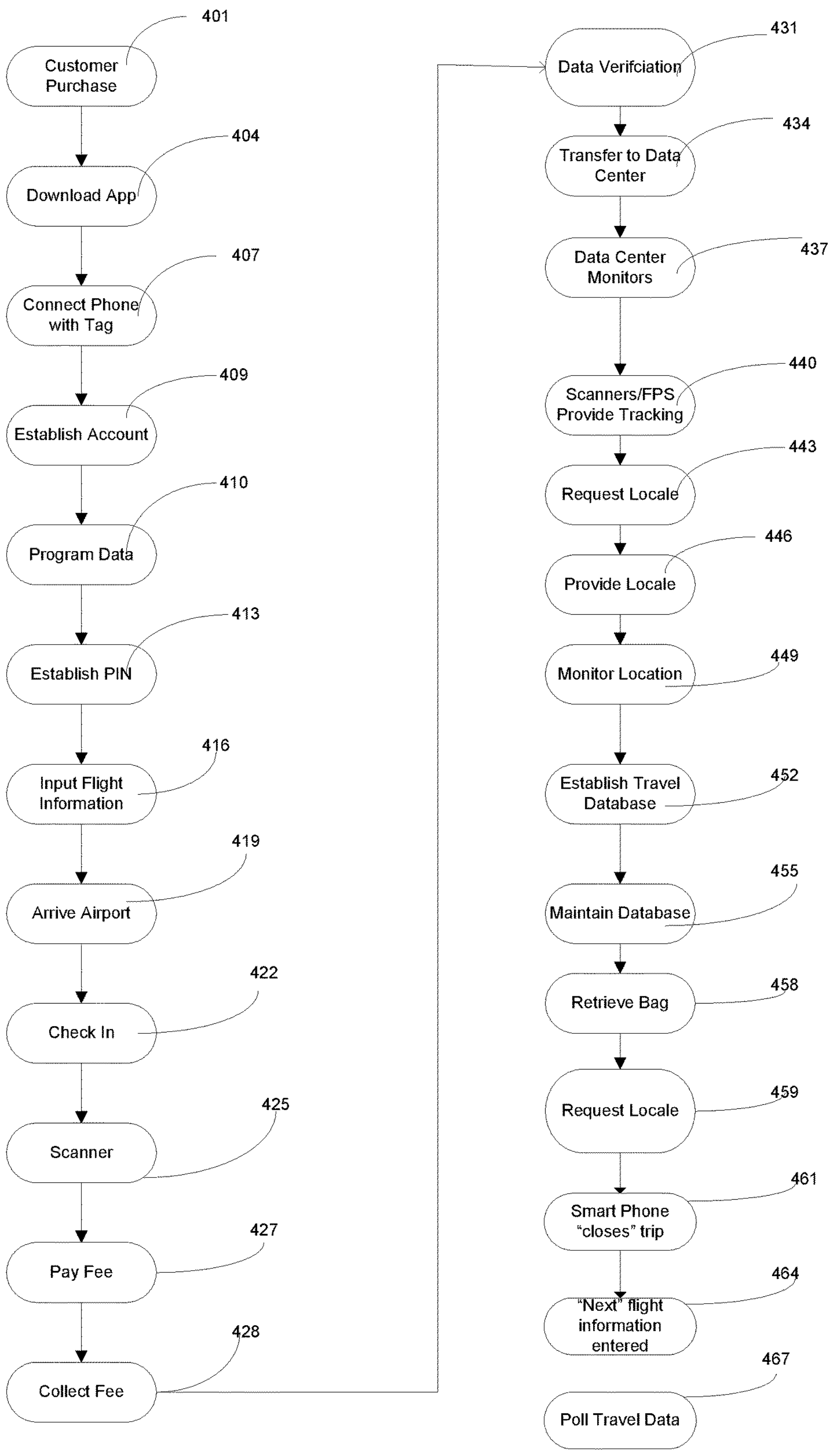
FIG. 4 is a flowchart of the process of the present invention.

Referring now to FIG. 4 herein, the method of utilization of the baggage identification and location system 100 is outlined therein. In step 401 an individual will purchase the baggage identification and location system 100 wherein the purchase thereof provides at least one baggage tag device 10 and access to download the software application from an operator provided website to a device such as but not limited to a smartphone. In step 404, the user will access the website provider by the operator and download the software application to a suitable computing device. Step 407, ensuing the loading of the software application onto a computing device, the user will communicably couple the computing device to at least one baggage tag device 10 and establish an account wherein the account is stored in the database of the data center 300. It is contemplated within the scope of the present invention that step 407 could utilize Bluetooth or other wireless communication protocols as discussed herein to establish communication between the computing device and the baggage tag device 10. Step 409, the user will establish an account for subsequent population of data wherein the account is maintained in the relational database stored in the data center 300. In step 410, the user will program data such as but not limited to contact information into the baggage tag device 10 utilizing the software application of the present invention. It is contemplated within the scope of the present invention that a user could purchase a plurality of baggage tag devices 10 and the process described herein is applicable to each baggage tag device 10 owned by a user of the baggage identification and location system 100. In step 413, a user will establish a unique personal identification number for each baggage tag device 10 wherein the personal identification number is stored on the memory chip 14 of the baggage tag device 10. Step 416, a user will input flight information into the software application which is subsequently transferred to the data center 300 and further is associated with one baggage tag device 10. The flight information is transferred either automatically through a software interface or is manually input into the software application of the present invention. The flight information is further transferred to the data center 300 and stored in the account of the user. In step 419, the user will arrive to the airport with baggage wherein the baggage has releasably secured thereto the baggage tag device 10. Step 422, the user will check-in for the flight for which the user has made a reservation thereon. In step 425, during the check-in process, an airline employee or similar individual will utilize a scanner 200 to communicate with the baggage tag device 10 so as to obtain the information therefrom regarding the pending flight travel for the user. The pending flight information entered in step 416 that was stored in the memory chip 14 is accessible by the RFID chip 15 wherein the RFID module 210 communicates therewith so as to obtain the flight information. As previously discussed herein, it is contemplated within the scope of the information that the flight information could be stored and subsequently dispatched utilizing alternate communication protocols. Step 427, the airline, or other entity that executed the scanning of the baggage tag device 10 in step 425 pays a transactional fee for the scanning of the baggage tag device 10. In step 428, the owner of the baggage identification and location system 100 collects a fee from the airline, or other entity executing step 425.

Step 431, the flight data collected in step 425 is verified wherein the data is cross-referenced for accuracy with the flight itinerary of the owner of the baggage tag device 10. Additionally, in step 431, subsequent data verification, the baggage tag device 10 scanned is place in active tracking status. In step 434, the data center 300 receives a signal from the scanner 200 with the information of the scanned baggage tag device 10 confirming that the scanned baggage tag device 10 is in active tracking status. In step 437, the scanner 200, first wireless module 18, second wireless module 19, GPS module 16 engage as previously discussed herein so as to provide tracking of the baggage tag device 10. Step 440, the data center 300 continuously monitors and records the location of the baggage tag device 10. In step 443, the location of the baggage tag device 10 is requested. The location request for the baggage tag device 10 can be executed by the user via the software application or can be executed by data center personnel. In step 449, the data center 300 continuously monitors the location of the baggage tag device 10. Step 452, a travel database is established within the account for the user of the baggage tag device 10. The travel database is initiated during the first use of the baggage tag device 10. In step 455, the travel database is recorded and maintained containing the travel history of the baggage tag device 10. This travel history is provided to various entities such as but not limited to legal authorities and travel agencies. In step 458, the user will retrieve bag at destination. In step 459, if the user is unable to locate the bag to which the baggage tag device 10 is secured, the user will utilize the baggage identification and location system 100 as discussed herein to identify the geographic location of the baggage tag device 10. In step 461, the user will engage the software application and enter data to establish that the current travel has been completed. Step 464, the user will enter flight information as was described in step 416 and the subsequently defined process will be repeated. In step 467, the travel history contained in travel database within the account for a user of the baggage tag device 10 is requested. The travel history can be requested and/or provided to various entities such as legal authorities or entities that are involved in the travel industry wherein the latter is provided so as to offer promotions based on the travel data of the user of the baggage tag device 10. Additionally, the travel history is provided to health agencies in the event of health crisis such as but not limited to bird flu wherein individuals can be either alerted and/or questioned about a particular health concern as a result of traveling to a particular destination.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A baggage identification and location system that is configured to provide a user the location of a luggage bag having a baggage tag of the present invention comprising the steps of:

- providing a plurality of baggage tags, wherein the plurality of baggage tags configured to be releasably secured to a piece of luggage, said plurality of baggage tags having disposed therein a first wireless communications module and a second wireless communications module, said plurality of baggage tags further including a central processing unit coupled to the first wireless communications module and second wireless communications module;
- providing a software application, said software application being provider to a user of the baggage identification and location system via a website and configured to be downloaded to a portable computing device;
- providing a data center, said data center being communicably coupled to the Internet, said data center having a plurality of computers with operating software operable to control the operation of the baggage identification and location system;
- securing one of said plurality of baggage tags to a piece of luggage;
- providing a plurality of scanners, said plurality of scanners communicably coupled to the software application, the data center and the plurality of baggage tags;
- establishing an account, said establishing an account being executed with the software application wherein the software application is communicably coupled to the data center and account information is input and stored therein;
- pairing at least one baggage tag with the software application, wherein the at least one baggage tag is communicably coupled with the software application;
- programming the baggage tag, said programming the baggage tag operable to input and store user information onto said baggage tag;
- establishing a unique personal identification number, said unique personal identification number being established for the baggage tag;
- inputting flight information, said flight information being entered into the baggage tag via the software application;
- receiving the luggage to which the baggage tag is secured thereto;
- scanning the baggage tag, said baggage tag being scanned by one of said plurality of scanners;
- monitoring the location of the baggage tag, wherein the location of the baggage tag is communicated to the data center and stored therein; and
- providing the location of the baggage tag, said location of said baggage tag being provided to a requestor.

2. The baggage identification and location system as recited in claim 1, and further including the step of placing the plurality of scanners within an airport facility, wherein the plurality of scanners are place in various locations within an airport facility along a luggage travel path.

3. The baggage identification and location system as recited in claim 2, and further including the step of collecting a fee, said fee being collected by a owner of the baggage identification and location system subsequent said scanning the baggage tag.

4. The baggage identification and location system as recited in claim 3, and further including the step of establishing travel history, said travel history being stored in said account on said data center, said travel history containing all flight data for said baggage tag.

5. The baggage identification and location system as recited in claim 4, and further including the step of providing the travel history to a requestor.

6. The baggage identification and location system as recited in claim 5, and further including the step of providing a RFID chip and a RFID reader module, said RFID chip being disposed within said plurality of baggage tag and said RFID reader module being disposed within said plurality of scanners.

7. The baggage identification and location system as recited in claim 6, and further including the step of broadcasting an audio alarm, said audio alarm being broadcast from said baggage tag subsequent the step of providing the location of the baggage tag.

8. A baggage identification and location system having a plurality of baggage tags configured to provide the tracking and location thereof comprising the steps of:

providing a plurality of baggage tags, wherein the plurality of baggage tags configured to be releasably secured to a piece of luggage, said plurality of baggage tags having a housing wherein the housing includes an interior volume, said plurality of baggage tags having disposed therein a first wireless communications module and a second wireless communications module, said plurality of baggage tags further including a central processing unit and a memory chip coupled to the first wireless communications module and second wireless communications module, said plurality of baggage tags further including a RFID chip, said plurality of baggage tags having a power supply disposed within said housing;

providing a software application, said software application being provider to a user of the baggage identification and location system via a website and configured to be downloaded to a portable computing device;

providing a data center, said data center being communicably coupled to the Internet, said data center having a plurality of computers with operating software operable to control the operation of the baggage identification and location system;

providing a plurality of scanners, said plurality of scanners communicably coupled to the software application, the data center and the plurality of baggage tags, said plurality of scanners being installed in an airport facility, said plurality of scanners being installed along a pathway in which luggage is distributed through an airport;

securing one of said plurality of baggage tags to a desired piece of luggage;

establishing an account, said establishing an account being executed with the software application wherein the software application is communicably coupled to the data center and account information is input and stored therein;

pairing at least one baggage tag with the software application, wherein the at least one baggage tag is communicably coupled with the software application;

programming the baggage tag, said programming the baggage tag operable to input and store user information onto said baggage tag;

establishing a unique personal identification number, said unique personal identification number being established for the baggage tag;

inputting flight information, said flight information being entered into the baggage tag via the software application;

transporting the luggage having the baggage tag secured thereto to an airport;

receiving the luggage to which the baggage tag is secured thereto, wherein the luggage is received by airport personnel;

scanning the baggage tag, said baggage tag being scanned by one of said plurality of scanners, said scanning the baggage tag operable to collect pending travel data;

transferring the pending travel data to said account of the user of the baggage tag;

establishing an active travel plan, said active travel plan being initiated within the account of the user;

monitoring the location of the baggage tag, wherein the location of the baggage tag is communicated to the data center and stored therein;

requesting the location of the baggage tag, wherein a user utilizes the software application to communicate to the data center a request for the location of the baggage tag associated with the active travel plan;

providing the location of the baggage tag, said location of said baggage tag being provided to a requestor.

9. The baggage identification and location system as recited in claim 8, and further including the step of providing an audio speaker, said audio speaker being disposed within the housing of said plurality of baggage tags.

10. The baggage identification and location system as recited in claim 9, and further including the step of establishing a travel database, wherein the travel data is compiled therein and retained.

11. The baggage identification and location system as recited in claim 10, and further including the step of providing a plurality of transceivers, said plurality of transceivers being disposed in said plurality of scanners and said plurality of baggage tags, said plurality of transceivers configured to control transmission of data signals transferred within the baggage identification and location system.

12. The baggage identification and location system as recited in claim 11, and further including the step of requesting the travel data, wherein the travel data within the travel database is provided to a requesting entity.

13. The baggage identification and location system as recited in claim 12, and further including the step of collecting a fee, said collecting a fee occurring subsequent the step of scanning the baggage tag.

14. The baggage identification and location system as recited in claim 13, and further including the step of broadcasting an audio alarm, said audio alarm being broadcast from said baggage tag subsequent the step of providing the location of the baggage tag.

15. A baggage identification and location system having a plurality of baggage tags configured to provide the tracking and location thereof comprising the steps of:

providing a plurality of baggage tags, wherein the plurality of baggage tags configured to be releasably secured to a piece of luggage, said plurality of baggage tags having a housing wherein the housing includes an interior volume, said plurality of baggage tags having disposed therein a first wireless communications module and a second wireless communications module, said plurality of baggage tags further including a central processing unit and a memory chip coupled to the first wireless communications module and second wireless communications module, said plurality of baggage tags further including a RFID chip, said plurality of baggage tags having a power supply disposed within said housing, said plurality of baggage tags having an audio speaker disposed within said housing;

providing a software application, said software application being provider to a user of the baggage identification and location system via a website and configured to be downloaded to a portable computing device;

providing a data center, said data center being communicably coupled to the Internet, said data center having a plurality of computers with operating software operable to control the operation of the baggage identification and location system;

providing a plurality of scanners, said plurality of scanners communicably coupled to the software application, the data center and the plurality of baggage tags, said plurality of scanners being installed in an airport facility, said plurality of scanners being installed along a pathway in which luggage is distributed through an airport;

securing one of said plurality of baggage tags to a desired piece of luggage;

establishing an account, said establishing an account being executed with the software application wherein the software application is communicably coupled to the data center and account information is input and stored therein;

pairing at least one baggage tag with the software application, wherein the at least one baggage tag is communicably coupled with the software application;

programming the baggage tag, said programming the baggage tag operable to input and store user information onto said baggage tag;

establishing a unique personal identification number, said unique personal identification number being established for the baggage tag;

inputting flight information, said flight information being entered into the baggage tag via the software application;

transporting the luggage having the baggage tag secured thereto to an airport;

receiving the luggage to which the baggage tag is secured thereto, wherein the luggage is received by airport personnel;

scanning the baggage tag, said baggage tag being scanned by one of said plurality of scanners, said scanning the baggage tag operable to collect pending travel data;

collecting a fee, said fee being collected by an owner of the baggage identification and location system each occurrence of the step of scanning the baggage tag;

transferring the pending travel data to said account of the user of the baggage tag;

establishing an active travel plan, said active travel plan being initiated within the account of the user;

monitoring the location of the baggage tag, wherein the location of the baggage tag is communicated to the data center and stored therein;

requesting the location of the baggage tag, wherein a user utilizes the software application to communicate to the data center a request for the location of the baggage tag associated with the active travel plan;

providing the location of the baggage tag, said location of said baggage tag being provided to a requestor.

16. The baggage identification and location system as recited in claim 15, and further including the step of providing a plurality of transceivers, said plurality of transceivers being disposed in said plurality of scanners and said plurality of baggage tags, said plurality of transceivers configured to control transmission of data signals transferred within the baggage identification and location system.

17. The baggage identification and location system as recited in claim 16, and further including the step of establishing a travel database, wherein the travel data is compiled therein and retained.

18. The baggage identification and location system as recited in claim 17, and further including the step of broadcasting an audio alarm, said audio alarm being broadcast from said audio speaker subsequent the step of providing the location of the baggage tag.

19. The baggage identification and location system as recited in claim 18, and further including the step of requesting the travel data, wherein the travel data within the travel database is provided to a requesting entity.

20. The baggage identification and location system as recited in claim 19, and further including providing the travel data to the requesting entity.

* * * * *